United States Patent
Takada

(10) Patent No.: US 10,552,088 B2
(45) Date of Patent: Feb. 4, 2020

(54) COMPUTER SYSTEM AND METHOD FOR REDUNDANTIZING NONVOLATILE MEMORY

(71) Applicant: Hitachi, Ltd., Chiyoda-ku, Tokyo (JP)

(72) Inventor: Masanori Takada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/081,567

(22) PCT Filed: Apr. 19, 2016

(86) PCT No.: PCT/JP2016/062319
§ 371 (c)(1),
(2) Date: Aug. 31, 2018

(87) PCT Pub. No.: WO2017/183096
PCT Pub. Date: Oct. 26, 2017

(65) Prior Publication Data
US 2019/0317695 A1    Oct. 17, 2019

(51) Int. Cl.
*G06F 3/06* (2006.01)
(52) U.S. Cl.
CPC .......... *G06F 3/0659* (2013.01); *G06F 3/0604* (2013.01); *G06F 3/0688* (2013.01)
(58) Field of Classification Search
CPC ..... G06F 3/0604; G06F 3/0659; G06F 3/0688
See application file for complete search history.

(56) References Cited

U.S. PATENT DOCUMENTS

| 6,990,603 B2 * | 1/2006 | Strasser | G06F 11/1441 711/133 |
| 2009/0292891 A1 | 11/2009 | Fujita et al. | |
| 2014/0281123 A1 * | 9/2014 | Weber | G06F 12/0246 711/103 |
| 2015/0317093 A1 | 11/2015 | Okada et al. | |
| 2017/0039110 A1 | 2/2017 | Tanaka et al. | |

FOREIGN PATENT DOCUMENTS

| JP | H07-253856 A | 10/1995 |
| JP | 2014-167818 A | 9/2014 |
| WO | 2008/105098 A1 | 9/2008 |
| WO | 2015/097751 A1 | 7/2015 |
| WO | 2015/162717 A1 | 10/2015 |

OTHER PUBLICATIONS

NVM Programming Model (NPM) Version 1, SNIA Technical Position, Dec. 21, 2013, 85 pages.

* cited by examiner

*Primary Examiner* — Aracelis Ruiz
(74) *Attorney, Agent, or Firm* — Procopio, Cory, Hargreaves & Savitch LLP

(57) ABSTRACT

A computer system including: a first computer including a first processor and a first nonvolatile memory; and a second computer including a second processor and a second nonvolatile memory in which the second computer is connected to the first computer. The first computer includes a redundant hardware that, on receiving a write command from the first processor, writes the write data of the write command both into the first nonvolatile memory and into the second computer.

10 Claims, 11 Drawing Sheets

FIG. 5

CORE 0  6a

| ADDR 51-0 | LENGTH[B] 52-0 | DATA 53-0 | 50-0 |
|---|---|---|---|
| 0x1234_000 | 4 | 0x1234_5678 | |
| 0x5678_0000 | 64 | 0x9abc_def0_... | |
| 0x7abc_0000 | 8 | 0x9abc_def0_1234_5678 | |

...

CORE n

| ADDR 51-n | LENGTH[B] 52-n | DATA 53-n | 50-n |
|---|---|---|---|
| 0x1234_000 | 4 | 0x1234_5678 | |
| 0x5678_0000 | 64 | 0x9abc_def0_... | |
| 0x7abc_0000 | 8 | 0x9abc_def0_1234_5678 | |

FIG. 6

| 81 | 82 | 83 | 84 | 81 | 82 | 83 | 84 |
|---|---|---|---|---|---|---|---|
| 0x1234_000 | 4 | 0x1234_5678 | | 0x5678_0000 | 64 | 0x9abc_def0_... | | ...

COMPUTER SYSTEM AND METHOD FOR
REDUNDANTIZING NONVOLATILE
MEMORY

CROSS-REFERENCE TO RELATED
APPLICATIONS

This application is a U.S. National Stage entry of PCT Application No: PCT/JP2016/062319 filed Apr. 19, 2016, the contents of which are incorporated herein by reference.

TECHNICAL FIELD

The present invention relates to nonvolatile memory.

BACKGROUND ART

In recent years, large capacity nonvolatile memories such as a flash memory and an MRAM (Magnetoresistive Random Access Memory) have been widespread. Therefore, in computer system, a trend of the usage of these memories instead of a DRAM (Dynamic Random Access Memory) has been developing.

In storage systems, a scheme of using DRAMs as cache memories to reduce the number of accesses to HDDs and to improve the performances of a storage system has been adopted conventionally. In addition to the using of DRAMs, a case where nonvolatile memories are used in combination of DRAMs has been well known as disclosed in Patent Literature 1. Furthermore, in order to taking measures against a hardware failure, as disclosed in Patent literature 2, a scheme in which two hardware components are prepared for data to be duplicated in each of the two hardware components.

In a server system, as a software interface for using nonvolatile memories instead of volatile memories such as a DRAM, a hardware-software interface has been proposed in which writing data in a DRAM is executed in a usual manner, and at a timing when the nonvolatilization of data should be assured, commit processing is performed as disclosed in Nonpatent Literature 1. With the use of hardware and software in conformity to this interface, the nonvolatile of data can be assured even in the case of a failure such as power-off.

In addition, disclosed in Nonpatent literature 1 is a technology in which nonvolatile memories can be treated with the use of a software interface equal to a software interface used for treating DRAMs.

CITATION LIST

Patent Literature

Patent Literature 1: WO 2015/097751
Patent Literature 2: Japanese Unexamined Patent Application Publication No. 2014-167818

Nonpatent Literature

Nonpatent Literature 1: NVM Programming Model (NPM) Version 1, SNIA Technical Position, Dec. 21, 2014

SUMMARY OF INVENTION

Technical Problem

If a memory that has a nonvolatile characteristic and that is durable against failures is realized and that is used in almost the same manner as a DRAM is used from a view point of software, it can be expected that highly reliable and high-performance software and a highly reliable and high-performance computer system are realized.

In Patent Literature 1 and Patent Literature 2, the application of nonvolatile memories is limited to the usage as cache memories for storage, and although technologies regarding the realization of redundancy of data and non-volatilization of data are described in these patent literatures, these technologies become effective on the premise that a special hardware operation is executed by software.

Therefore, in the abovementioned examples, software is required to perform a special operation, and on top of that, the amount of software processing is increased, which leads to the degradation of the performance. Furthermore, In the abovementioned Nonpatent Literature, although the technology in which nonvolatile memories can be treated with the use of a software interface equal to that used for treating DRAMs, a method for realizing the nonvolatilization and redundancy of memories is not disclosed.

In consideration of these problems, the present invention proposes a technology in which nonvolatile memories are treated with the use of a software interface equal to that used for treating DRAMs while the nonvolatile and redundancy of the DRAMs are secured.

Solution to Problem

A computer system that includes: a first computer including a first processor and a first nonvolatile memory; and a second computer including a second processor and a second nonvolatile memory and being connected to the first computer, where the first computer includes a redundant hardware that, on receiving a write command from the first processor, writes the write data of the write command both into the first nonvolatile memory and into the second computer, is proposed.

Advantageous Effects of Invention

Due to the present invention, it becomes possible to realize a software interface that is equivalent to the software interface for accessing a DRAM for accessing nonvolatile and redundant memories. As a result, it becomes easier to describe software for using nonvolatile and redundant memories with high performance as well, and applications that utilize these availabilities can be realized in many fields.

BRIEF DESCRIPTION OF DRAWINGS

FIG. 5 shows the first embodiment of the present invention and it is a diagram showing an example of a configuration of a writable buffer.

FIG. 6 shows the first embodiment of the present invention and it is a diagram showing an example of a transmission packet.

DESCRIPTION OF EMBODIMENTS

Hereinafter, the embodiments of the present invention will be explained with reference to the accompanying drawings. However, it should be noted that these embodiments are only examples for realizing the present invention, and the technological scope of the present invention is no limited by these embodiments. In addition, components that are common in the accompanying drawings are given the same reference signs.

First Embodiment

A first embodiment includes redundant hardware in which the redundancy of data is realized by a memory operation performed by software in a manner similar to a manner in which DRAMs is treated, and a computer system using the redundant hardware.

Figure 1:
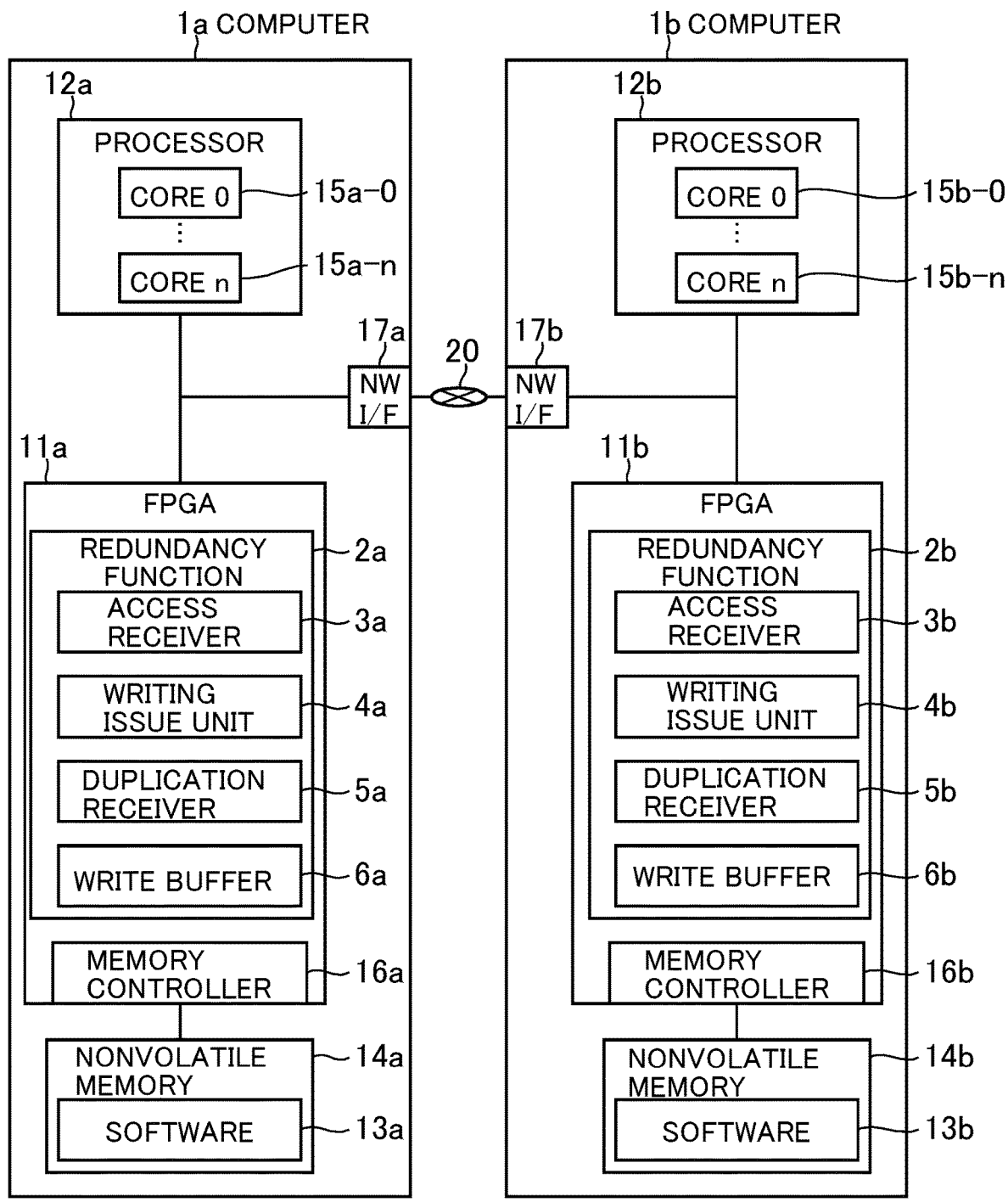
FIG. 1 shows a first embodiment of the present invention and it is a block diagram showing an example of a computer system.

FIG. 1 is a block diagram showing an example of a computer system to which the present invention is applied. The computer system includes two or more computers 1a and 1b, and a network 20 that connects these computers. Although, in an example shown in FIG. 1, there are two computers, and the two computers are directly connected to each other, it is also conceivable that three or more computers are used.

The computer 1a includes: a processor 12a; a nonvolatile memory 14a; an FPGA 11a on which a redundancy function 2a is mounted; and a network interface 17a, and these components are connected to one another. In the above example shown in FIG. 1, although the FPGA 11a is connected to the processor 12a, a connection other than the connection shown in FIG. 1 is also thinkable as long as the abovementioned components are accessible from one another, and further it is also conceivable that the FPGA 11a is embedded in the processor 12a. Furthermore, instead of the FPGA 11a, dedicated redundant hardware such as an ASIC can be also used.

The processor 12a includes plural processor cores 15a-0 to 15a-n (shown in FIG. 1 as core 0 to core n), and software 13a is executed on the processor cores 15a. In addition, the redundancy function 2a is installed in the FPGA 11a as hardware. Furthermore, a memory controller 16a that controls the nonvolatile memory 14a is installed in the FPGA 11a.

The computer 1b has a configuration similar to that of the computer 1a, and the components of the computer 1b are shown by the components of the computer 1a that have the subscripts of their reference signs changed from "a" to "b". Here, the generic terms of the components of the computers 1a and 1b are represented by reference signs without subscripts "a", "b", or "-".

The configuration of the redundant hardware function 2a that is needed for realizing redundancy of the nonvolatile memory 14a of the computer 1a in this first embodiment will be explained below. In this embodiment, an example in which redundancy is realized by the behavior of the processor core 15a that stores data not only in the nonvolatile memory 14a of the computer 1a but also in the nonvolatile memory 14b of the computer 1b will be shown.

A redundancy function 2 includes: an access receiver 3; a write issue unit 4; a duplication receiver 5; and a write buffer 6. The software 13a that realizes redundancy uses the access receiver 3a, the write buffer 6a, and the write issue unit 4a in the redundancy function 2a of the computer 1a, and also uses a duplication receiver 5b in the redundancy function 2b of the external computer 1b.

Here, when the software 13b of the computer 1b realizes redundancy, the software 13b uses the access receiver 3b, the write buffer 6b, and the write issue unit 4b in the redundancy function 2b of the computer 1b, and also uses a duplication receiver 5a in the redundancy function 2a of the external computer 1a.

On receiving a write command, a read command, and a commit command from a processor core 15, the access receiver 3 performs predefined processing for the respective commands. The write buffer 6 is a buffer for temporarily storing write data from the processor core 15. The write issue unit 4 effectively transmits data of the write buffer 6 to the other computer 1, and detects whether the transmitted data reaches the other computer 1 or not. The duplication receiver 5 receives the data transmitted by the write issue unit 4 of the other computer 1, writes the data into a nonvolatile memory 14, and responds to the detection of the arrival of the data.

Figure 4:
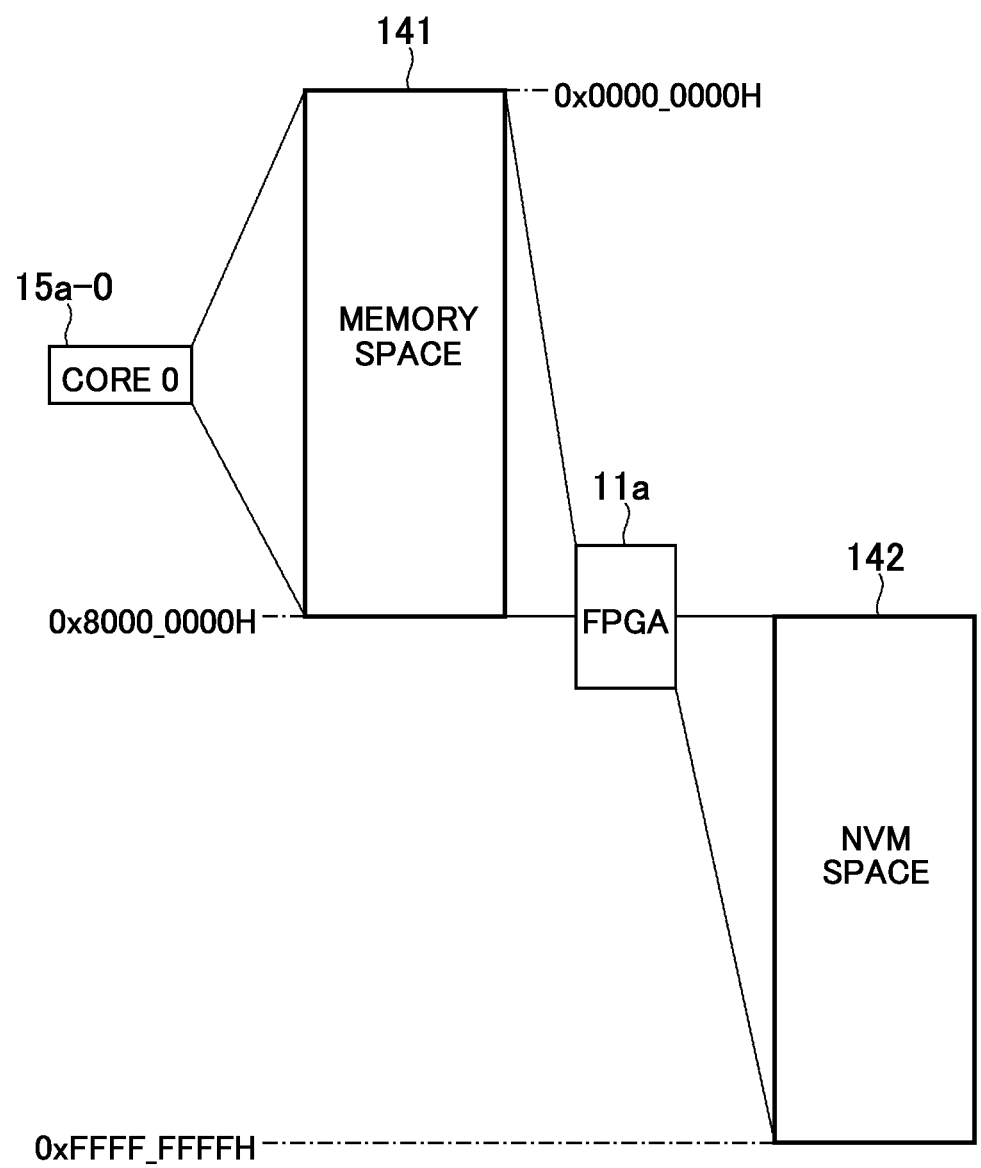
FIG. 4 shows the first embodiment of the present invention and it is a map showing an example of a memory space of a processor core and an example of a memory space of an FPGA.

FIG. 4 is a map showing an example of a memory space of the processor core 15 and an example of a memory space of an FPGA 11.

The FPGA 11 is mapped on a memory space 141 viewed from the processor core 15, and, for example, it will be assumed that addresses 0000_0000H to 7FFF_FFFF are addresses for the memory space 141 of the processor core 15a.

Not only the memory space 141 of the processor core 15 but also an NVM space 142 is assigned to the FPGA 11 as an address space of the nonvolatile memory 14, and, for example, addresses 8000_0000H to FFFF_FFFF are set as addresses for the NVM space 142 of the FPGA 11.

Although a case where direct access from the processor core 15 to the nonvolatile memory 14 is prohibited is shown in this first embodiment, the present invention is not limited to this case. For example, it is conceivable that the access space of the processor core 15 is configured to include the NVM space 142 as well as the memory space 141 as accessible spaces.

On receiving an access request to the memory space 141 from the processor core 15, the FPGA 11 converts the address of the memory space 141 into access to the NVM space 142, and executes the requested memory access. In this first embodiment, conversion information for a map and an offset that are used for converting the addresses of the memory space 141 into the addresses of the NVM space 142 and vice versa are set in advance in the FPGA 11.

Figure 2:
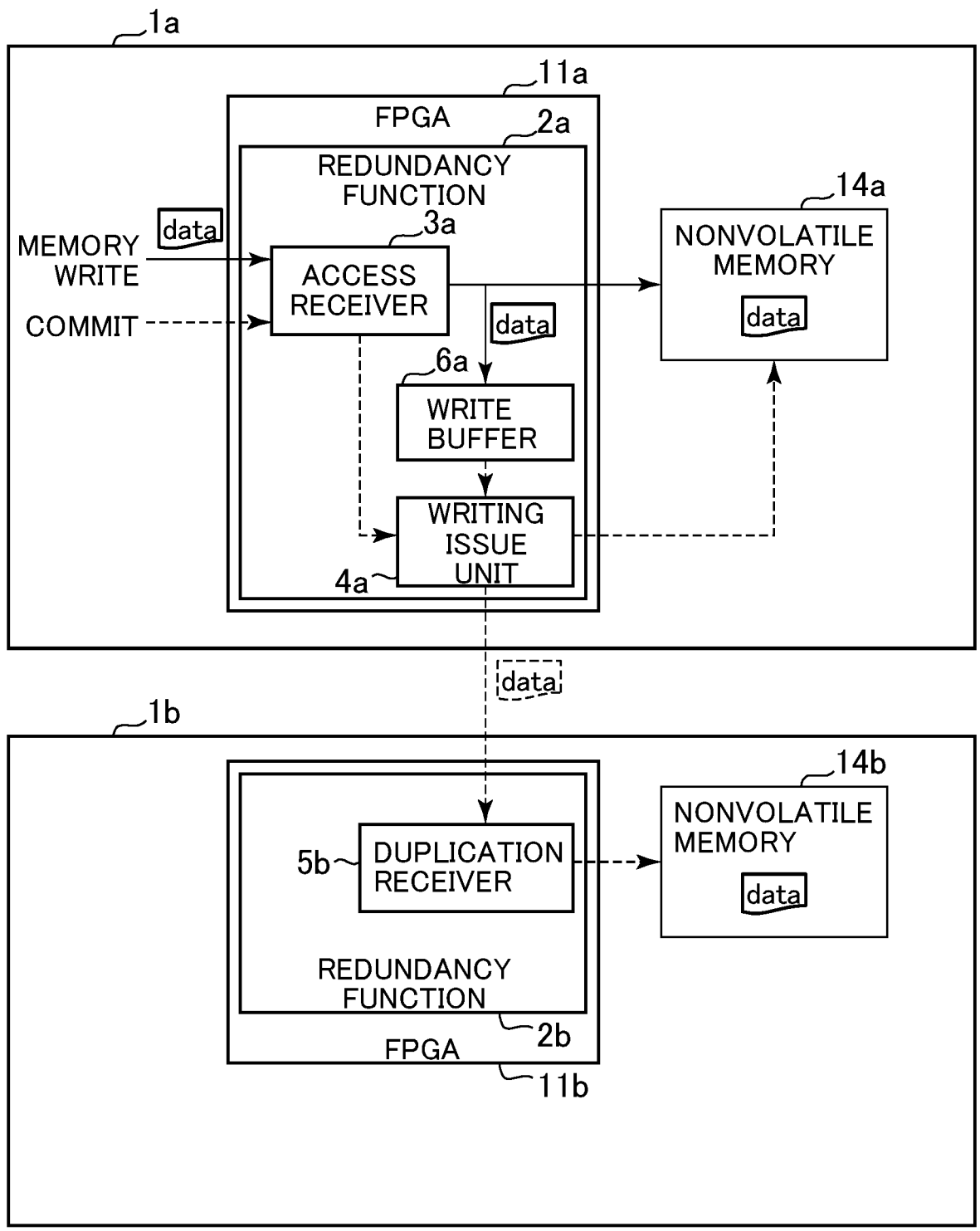
FIG. 2 shows the first embodiment of the present invention and it is an explanatory diagram showing an example of writing data from a processor core to a volatile memory.

FIG. 2 shows a scheme in this embodiment in which data is written into the nonvolatile memory 14a of the computer 1a, and at the same time data is also written into the nonvolatile memory 14b of the computer 1b in accordance with a write command from the processor core 15a of the computer 1a.

The processor core 15a executes memory write on the memory space 141 of the FPGA 11a. After the FPGA 11a receives the write request, the access receiver 3a of the FPGA 11a writes data on the nonvolatile memory 14a of this computer 1a, and subsequently transmits the write command and the data to the FPGA 11b of the computer 1b.

In the FPGA 11a as redundant hardware in this first embodiment, on receiving the write request from the processor core 15a, the access receiver 3a writes the data into the nonvolatile memory 14a and the write buffer 6a first. Next, on receiving a commit request from the processor core 15a, the access receiver 3a of the FPGA 11a makes the write issue unit 4a transmit the data stored in the write buffer 6a to the computer 1b.

The duplication receiver 5b of the FPGA 11b of the computer 1b writes the received data into the nonvolatile memory 14b on the basis of the data and the write command received from the external computer 1a. After the data writing is completed, the duplication receiver 5b of the FPGA 11b informs the computer 1a of the completion of the data writing.

On receiving commit completion notification from the computer 1b, which is the write destination, the write issue unit 4a of the FOGA 11a transmits commit completion notification to the processor core 15a that issued the commit request.

Here, when each of the processor cores 15a-0 to 15a-n issues a request to the FPGA 11a, it is necessary that each of the processor cores 15a-0 to 15a-n should attach its own identifier to a message in which the request is described. As a result, the FPGA 11a can specify a processor core of the processor cores 15a-0 to 15a-n to which the FPGA 11a should transmits a response or the like.

Furthermore, the write issue unit 4a of the FPGA 11a can transmit a commit request to the memory controller 16a of its own computer 1a. In this case, if the memory controller 16a is holding the previous data, on receiving the commit request, the memory controller 16a deletes the relevant previous data from the nonvolatile memory 14a, and informs the write issue unit 4a of the FPGA 11a of the completion of the commitment.

After receiving commit completion notification from the memory controller 16a of its own computer 1a and commit completion notification from the external computer 1b, the write issue unit 4a of the FPGA 11a transmits commit completion notification to the processor core 15a that is the sender of the commit request, and completes the processing of the commit request.

Figure 3:
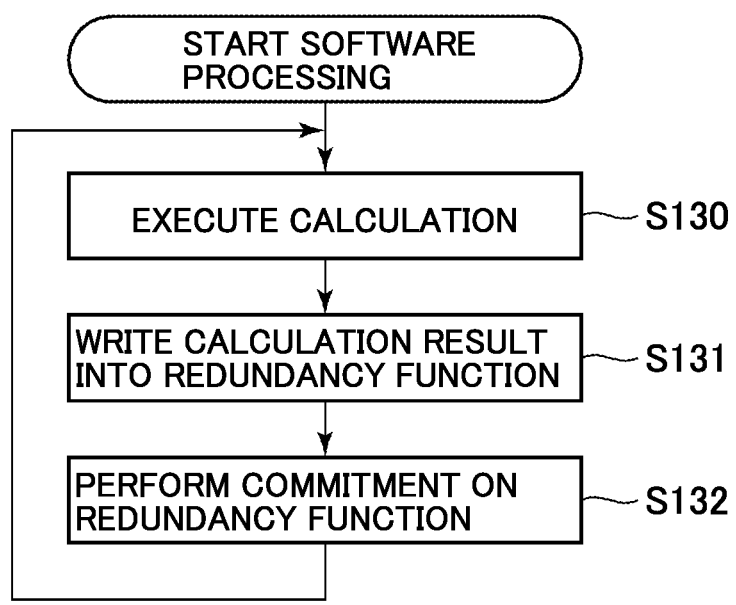
FIG. 3 shows the first embodiment of the present invention and it is a flowchart showing an example of software executed in a processor core.

FIG. 3 shows an example of processing of software 13 performed by the processor core 15 in this embodiment.

After being loaded in the nonvolatile memory 14 that works as a main storage, the software 13 is executed by the processor core 15, so that predefined processing or a predefined calculation are performed (S130). Subsequently, the software 13 writes a result obtained by the processing or the calculation into the nonvolatile memory 14 (S131). When this writing is executed, the processor core 15 uses the redundancy function 2 of the FPGA 11.

After executing the writing, the processor core 15 performs commit processing in order to assure that the data is not volatilized (S132). The software 13 repeats the issuance of the commit request after issuing the write request as described above.

Although a case where the software 13 issues a commit request after issuing a write request is shown in this first embodiment, the present invention is not limited to this case. It is also conceivable that the software 13 issues only a write request, and it is not necessary for the software 13 to issue a commit request. In such a case, the FPGA 11a executes writing on the nonvolatile memory 14a and the external computer 1b in response to the writing request.

FIG. 5 is a diagram showing an example of the configuration and an example of the contents of the write buffer 6. The write buffer 6 includes tables 50-0 to 50-n corresponding to the processor cores 15a-0 to 15a-n respectively, and the processor core 15 executes writing in each entry of a table 50. The entries of the table 50 are composed of the addresses 51 of a writing destination, the lengths 52 of written data (byte length), and data 53.

At the time of the above commit processing, although all contents that have already been written into the write buffer 6 have to be swept out, target contents to be swept out are only contents that were written by a processor core 15 that issued the commit request. Therefore, time needed for the above sweeping-out processing is reduced by divining the tables 50-0 to 50-n in a way corresponding to the processor cores 15a-0 to 15a-n.

FIG. 6 is a diagram showing an example of data transmitted or received between the write issue unit 4 and the duplication receiver 5, that is to say, via the network 20. The data is equal to a combination of the entries of the write buffer 6, and it is composed of addresses 81, the lengths 82 of written data, written data 83, and pieces of information 84 that shows boundary to the next data.

Figure 7:
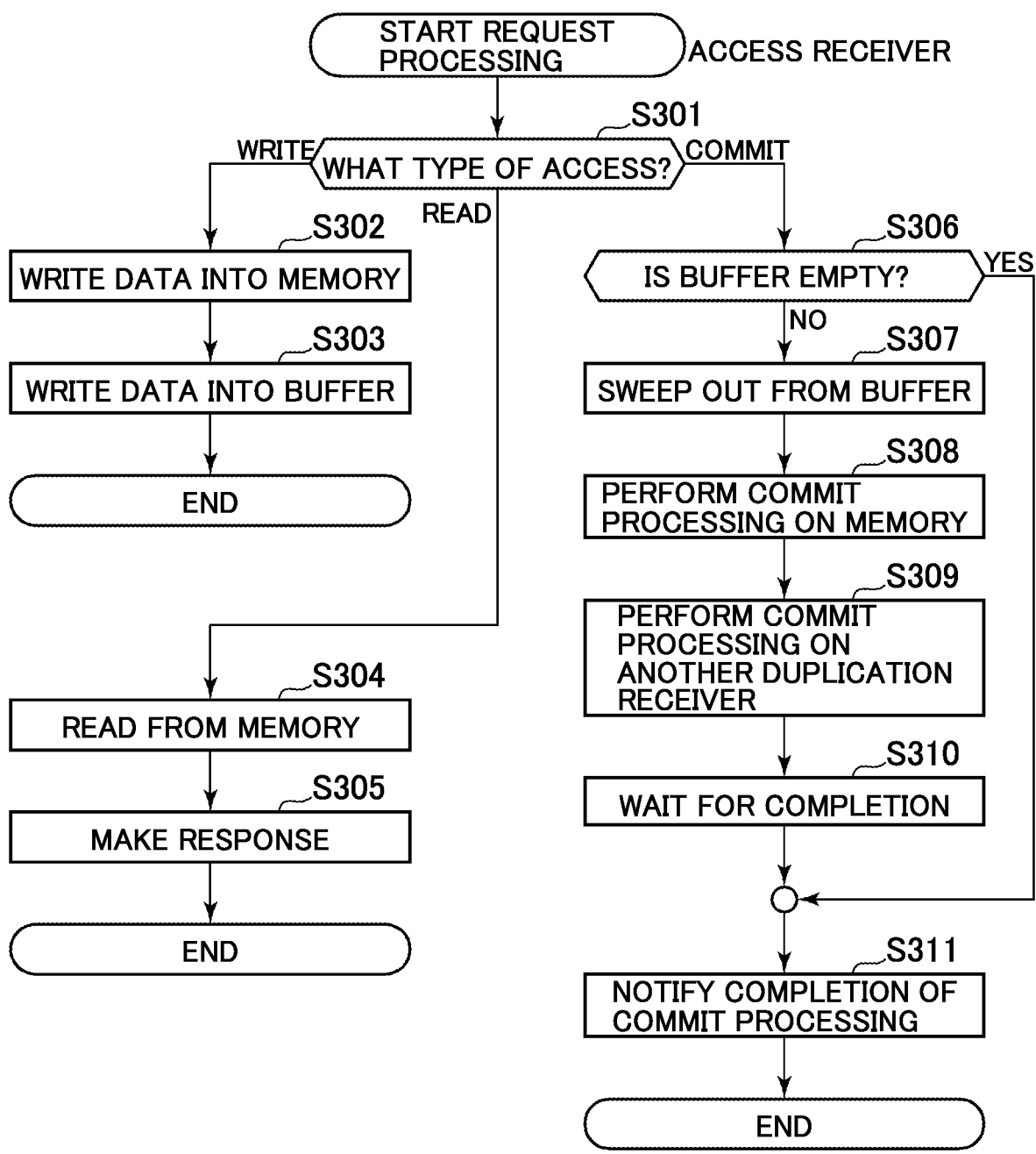
FIG. 7 shows the first embodiment of the present invention and it is a flowchart showing an example of processing performed in an access receiver.

FIG. 7 is a flowchart showing an example of processing performed by the access receiver 3 in this first embodiment. This processing is started at the time when there is an access from the processor core 15.

In this processing, the access receiver 3 judges the type of the access that the access receiver 3 received from the processor core 15 first (S301). If the type of the access is Write (a write request), the access receiver 3 converts an address specified by the processor core 15, and writes data into the nonvolatile memory 14 corresponding to the converted address in the NVM space 142 (S302).

Subsequently, the access receiver 3 adds an entry in a table 50 of the write buffer 6 corresponding to the processor core 15, writes the contents of the relevant address, the relevant data length, and the relevant data (S303), and completes this processing.

On the other hand, if the type of the access is Read at step S301, the access receiver 3 issues Read to a memory controller 16, and reads data corresponding to a specified address from the nonvolatile memory 14 (S304). Successively, the access receiver 3 transmits the read data to the processor core 15 (S305), and completes this processing.

If the type of the access is Commit at step S301, the access receiver 3 judges whether the write buffer 6 is empty or not first (S306). If the entry of a table of the tables 50-0 to 50-n corresponding to a processor core, which requested the commitment, of the processor cores 15a-0 to 15a-n is empty, the access receiver 3 proceeds to step S311, and if it is not empty, the access receiver 3 proceeds to step S307.

If the table 50 is used, the access receiver 3 sweeps out all contents of the table 50 of the write buffer 6 corresponding to the processor core 15 that requested the commitment (S307). Here, sweeping out in this case means ordering the write issue unit 4 to execute data writing so that all the contents (entries) stored in the table 50 of the write buffer 6 are transmitted to the computer 1b used for realizing redundancy.

This processing makes it possible that the data held in the table 50 of the write buffer 6 is written into the nonvolatile memory 14b of the external computer 1b and the redundancy of the data is secured.

The write issue unit 4, which received the command, performs commit processing on the memory controller 16 (S308), and performs the commit processing on the duplication receiver 5 of the other computer 1b (S309).

On receiving the commit request, the memory controller 16 deletes the previous data stored in the nonvolatile memory 14, and informs the write issue unit 4 of the completion of the commitment. On receiving the commit command, the duplication receiver 5b of the computer 1b transmits a response to notify the completion of the commitment.

The write issue unit 4 waits commit completion notification from the memory controller 16 and the external computer 1b (S310), and after receiving the notification from the memory controller 16 and the external computer 1b, the write issue unit 4 proceeds to step S311.

The write issue unit 4 transmits the completion of the commitment to the processor core 15 that is the requester of the commitment (S311), and completes this processing. On the other hand, if the table 50 of the write buffer 6 is judged to be empty at step S306, the access receiver 3 transmits the completion of the commitment to the processor core 15 that is the requester of the commitment, and completes this processing (S311).

The abovementioned processing makes it possible that the software 13 executed at processor core 15 can perform the duplication of data only by performing writing processing, reading processing and commit processing on the access receiver 3 in a similar way to performing writing processing, reading processing and commit processing on the nonvolatile memory 14.

Figure 8:
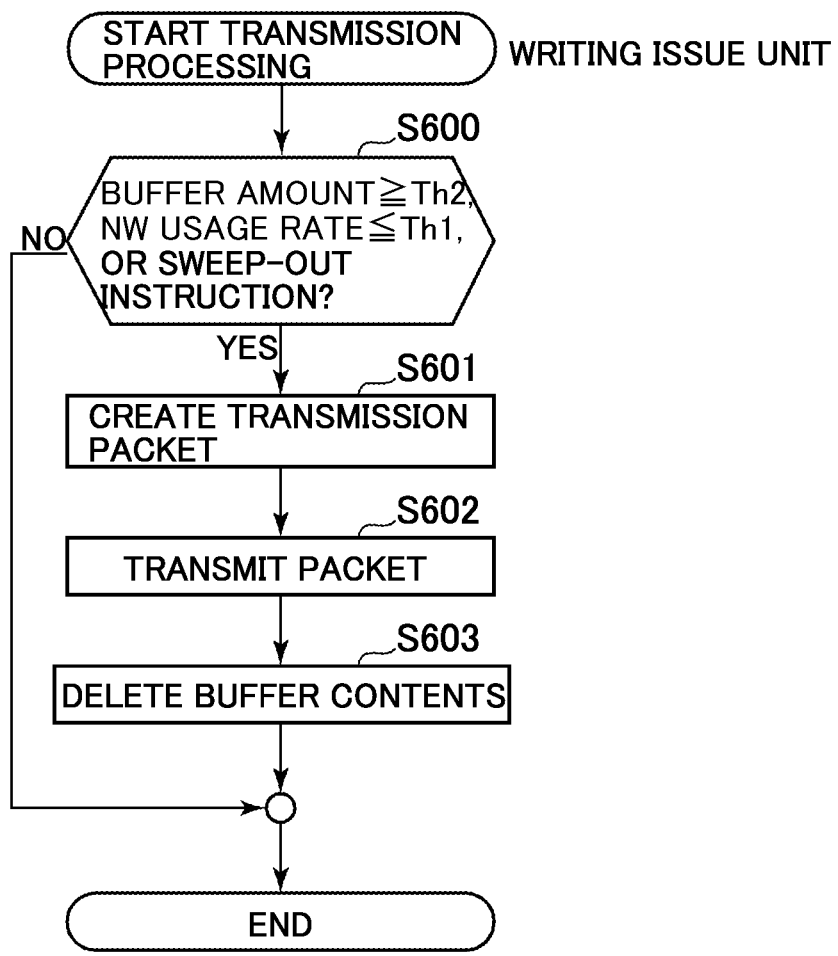
FIG. 8 shows the first embodiment of the present invention and it is a flowchart showing an example of processing performed in a write issue unit.

FIG. 8 is a flowchart showing an example of processing performed by the write issue unit 4 in this first embodiment. This processing is performed at a predefined interval (1 μs to 100 μs) or at step S307 in FIG. 7.

In this embodiment, the write issue unit 4 calculates the amount (size) of data remaining in the table 50 of the write buffer 6 and the usage rate of the network 20 first, judges whether a buffer sweep-out command has already been received or not, and further judges whether the sweep-out processing of the write buffer 6 should be executed or not (S600).

In this case, the write issue unit 4 calculates, for example, a ratio of the data transmission/reception amount of the network interface 16a per unit time to the theoretical transfer speed of the network 20 as the usage rate of the network 20. If the calculated usage rate is smaller than a predefined threshold Th1, the write issue unit 4 judges that the usage rate of the network 20 is low.

If the amount of data stored in the table 50 of the write buffer 6, the size of data to be transmitted through the network 20 becomes small, so that the usage efficiency of the network 20 becomes low. Therefore, if the amount of data stored in the table 50 is smaller than a threshold Th2, the write issue unit 4 does not transmits the data and pools the data in the table 50 of the write buffer 6.

In addition, in the case where the usage rate of the network 20 is low (the usage rate Th1), because, even if the usage rate of the network 20 is lowered by transmitting a small amount of data, there is little influence on the network 20, the write issue unit 4 positively transmits data in order to achieve an effect of reducing the transmission amount of data at the time of commit processing.

In order to realize the above, the write issue unit 4 proceeds to transmission processing described at step S601 and followings in which data sweep-out processing is performed if the amount of data of the table 50 is larger than the threshold Th2, for example. Furthermore, even if the amount of data in the table 50 of the write buffer 6 is equal to the threshold Th2 or smaller, but if the usage rate of the network 20 is equal to the threshold Th1 or smaller, the write issue unit 4 transmits the data. On the other hand, in the case where the write issue unit 4 has received the buffer sweep-out command from the processor 15, the write issue unit 4 unconditionally proceeds to step S601. Here, if the write issue unit 4 judges that it does not execute sweep-out processing, the write issue unit 4 finishes this processing without doing anything.

If the amount of data stored in the table 50 of the write buffer 6 is equal to the threshold Th2 or larger, or the usage rate of the network 20 is equal to the threshold Th1 or smaller, or when the write issue unit 4 receives the buffer sweep-out command, the write issue unit 4 writes the data stored into the table 50 in the external computer 1b.

Next, the write issue unit 4 generates a transmission packet on the basis of the contents of the table 50 that is the target of the sweep-out processing (S601). Subsequently, the write issue unit 4 transmits the generated packet to the duplication receiver 5 used for realizing redundancy and requests the data to be written (S602). The write issue unit 4 deletes the transmitted contents of the table 50 of the write buffer 6 (S603), and completes this processing.

As a result of the above processing, it becomes possible that the write issue unit 4 prevents the load of the network 20 from getting excessive, and effectively performs the duplication processing.

Figure 9:
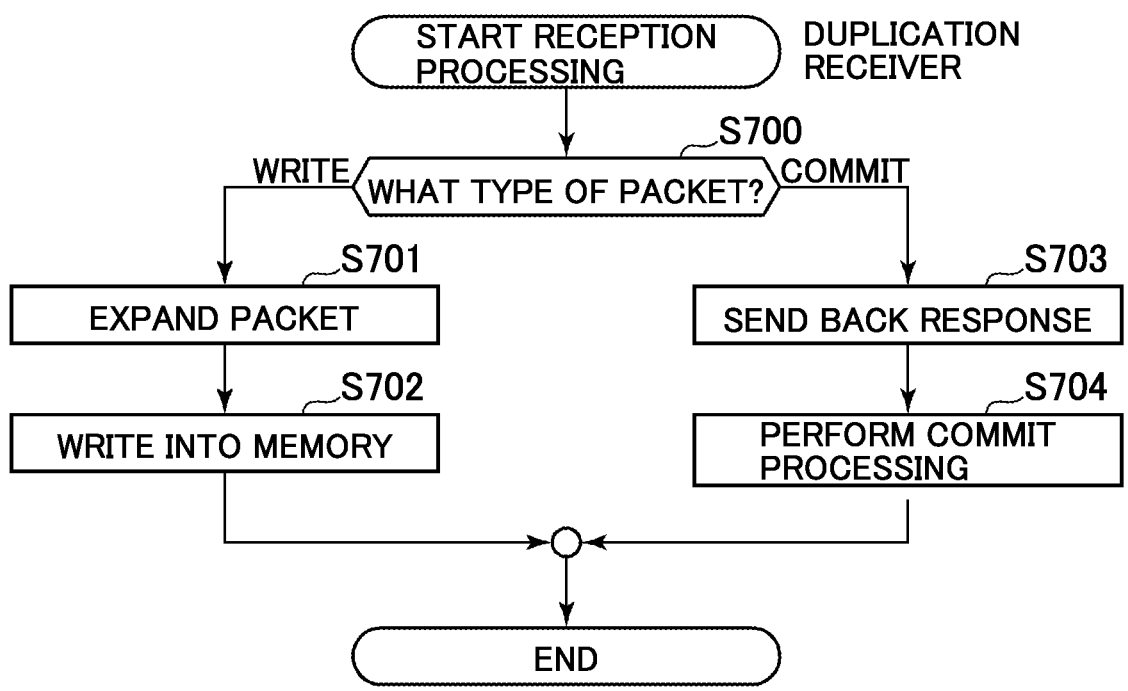
FIG. 9 shows the first embodiment of the present invention and it is a flowchart showing an example of processing performed in a duplication receiver.

FIG. 9 is a flowchart showing an example of processing performed in the duplication receiver 5 in this embodiment. This processing is called out when the duplication receiver 5 receives data from the duplication requester computer 1a.

In this processing, the duplication receiver 5 judges the type of the received packet first (S700). If the type is Write, the duplication receiver 5 expands the received packet, and obtains a data 83 to be written using an address 81 and a data length 82 (S701).

Subsequently, the duplication receiver 5 performs writing processing on the nonvolatile memory 14b using obtained data 83 and address 81 (S702), and completes this processing.

On the other hand, if the type is judged as a commit at the judgment at step S700, the duplication receiver 5 creates commit completion notification, and sends back the notification as a response (S703). Successively, the duplication receiver 5 performs commit processing on the nonvolatile memory 14b in the same computer 1b (S704). As for this commit processing, if the duplication receiver 5b requests this commit processing to the memory controller 16b, data that has been held in the nonvolatile memory 14b until this change is deleted.

As described above, according to this embodiment, if the processor core 15a issues a writing request to a memory, the FPGA 11a writes data not only into the nonvolatile memory 14a of the computer 1a to which the processor core 15a belongs, but also writes the data into the nonvolatile memory 14*b* of the external computer 1*b*, which makes it possible to secure the redundancy of the data. In other words, the FPGA 11*a* converts the write command issued from the processor core 15 into a write command to the nonvolatile memory 14 of the same computer 1*a* and a write (transmission) command to the other computer 1*b*.

In addition, a timing at which the FPGA 11*a* writes the data into the external computer 1*b* is set as a timing after the processor core 15 receives a commit request after a writing request from the processor core 15*a*, which makes it possible to secure the redundancy of the data the value of which is fixed.

Furthermore, on receiving a commit request, the FPGA 11*a* issues a commit request to the memory controller 16*a* and waits commit completion notification, while the FPGA 11*a* also issues the commit request to the external computer 1*b* and waits commit completion notification. Successively, after receiving commit completion notifications from the memory controller 16*a* and the external computer 1*b*, the FPGA 11*a* transmits commit completion notification to the processor core 15*a*, which makes it possible to assure the redundancy of the data.

In addition, if the usage rate of the network 20 is equal to the threshold Th1 or smaller, or the amount of data stored in the table 50 of the write buffer 6 is equal to the threshold Th2 or larger, or when the write issue unit 4 of the FPGA 11 receives the buffer sweep-out command, the write issue unit 4 writes the data stored in the table 50 into the external computer 1*b*, therefore the usage rate of the network 20 can be improved.

According to the first embodiment, non-volatile and reliable redundancy by the nonvolatile memories 14*a* and 14*b* can be realized using software interface equivalent to a DRAM. As a result, it becomes easier to describe software that is required to realize the availability of a nonvolatile memory 14 and high performance at the same time, and applications that utilize these availabilities can be realized in many fields.

Here, if the computers 1*a* and 1*b* are composed of blade servers and the like, a backplane can be used as the network 20. Furthermore, in the above-described embodiment, an example in which the FPGA 11 as apiece of redundant hardware is connected to the processor 12 is shown, but it is also conceivable that the processor 12 is configured to embed a piece of redundant hardware in it.

Second Embodiment

This second embodiment is configured in such a way that the write issue unit 4 shown by the first embodiment performs commit processing at a regular interval in order to improve the performance of the computer 1. Hereinafter, the differences between the first embodiment and the second embodiment will be explained.

Figure 10:
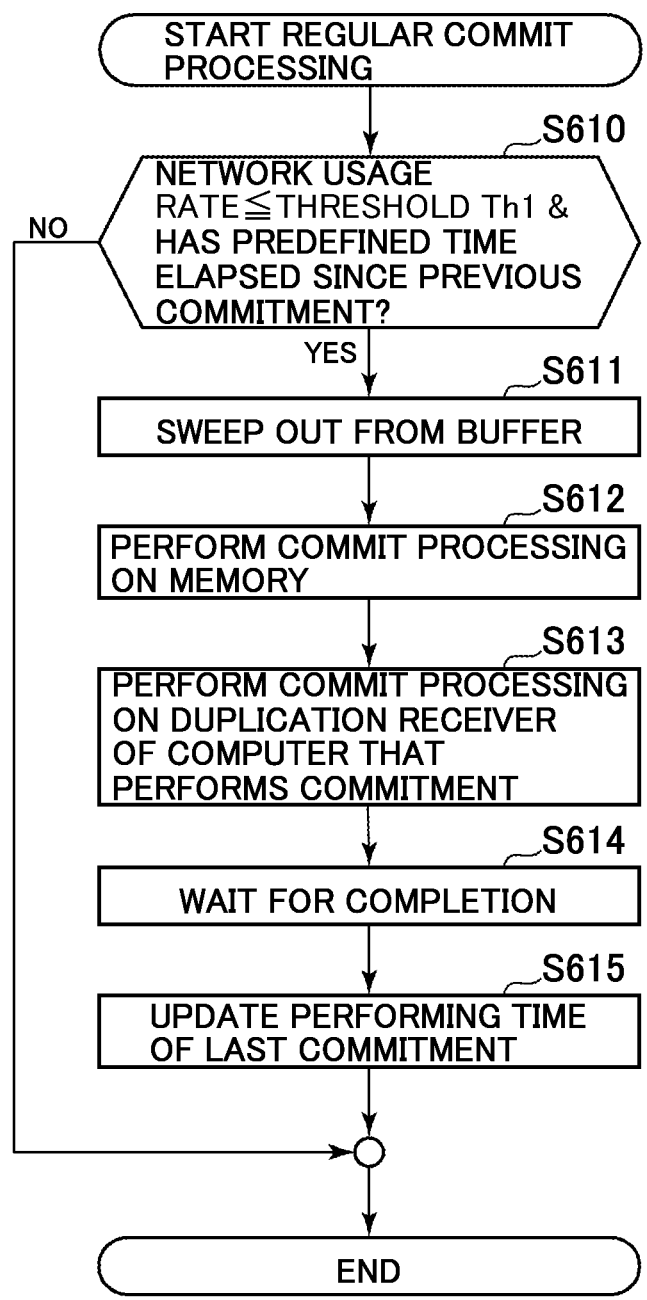
FIG. 10 shows a second embodiment of the present invention and it is a flowchart showing an example of regular commit processing.

FIG. 10 is a flowchart showing an example of regular commit processing 61 performed by the write issue unit 4 in the second embodiment. This processing is regularly performed at a predefined interval such as 1 µs to 100 µs or the like.

In this processing, the usage rate of the network 20 and an elapsed time since the last commit command is received are judged (S610). As is the case with the first embodiment, in the case where the usage rate of the network 20 exceeds the threshold Th1, or in the case where an elapsed time since the last commit processing does not exceeds the predefined time Th3 even if the usage rate of the network 20 is equal to the threshold Th1 or smaller, the write issue unit 4 prohibits the regular commit processing 61, and finishes this processing.

On the other hand, in the case where the usage rate of the network 20 is equal to the threshold Th1 or smaller and the elapsed time since the last commit processing exceeds the predefined time Th3 (equal to or larger than Th3), the write issue unit 4 starts the regular commit processing 61 (S611 to S614). These steps S611 to S614 are similar to steps S307 to S310 in FIG. 7 shown in the first embodiment. In addition, in this second embodiment, step S615 is added to the processing after the S614 as shown in FIG. 7, so that the performing time of the last commitment is updated.

In the above-described processing, the write issue unit 4 can sweep out data from the write buffer 6 at a regular interval, so that the amount of data of the write buffer 6 to be dealt with at the time of the reception of a commit request from the processor core 15 can be reduced. As a result, a time from commit processing performed by the processor 15 to the response of the commit processing completion can be reduced and the processing time of the processor core 15 can be reduced, which makes it possible to improve the processing performance of the relevant computer system.

Third Embodiment

This third embodiment is different from the first embodiment in that time of commit processing can be reduced by a response being exchanged between the computers 1*a* and 1*b* every time data reception is performed between them. Hereinafter, the differences between the first embodiment and the third embodiment will be explained.

Figure 11:
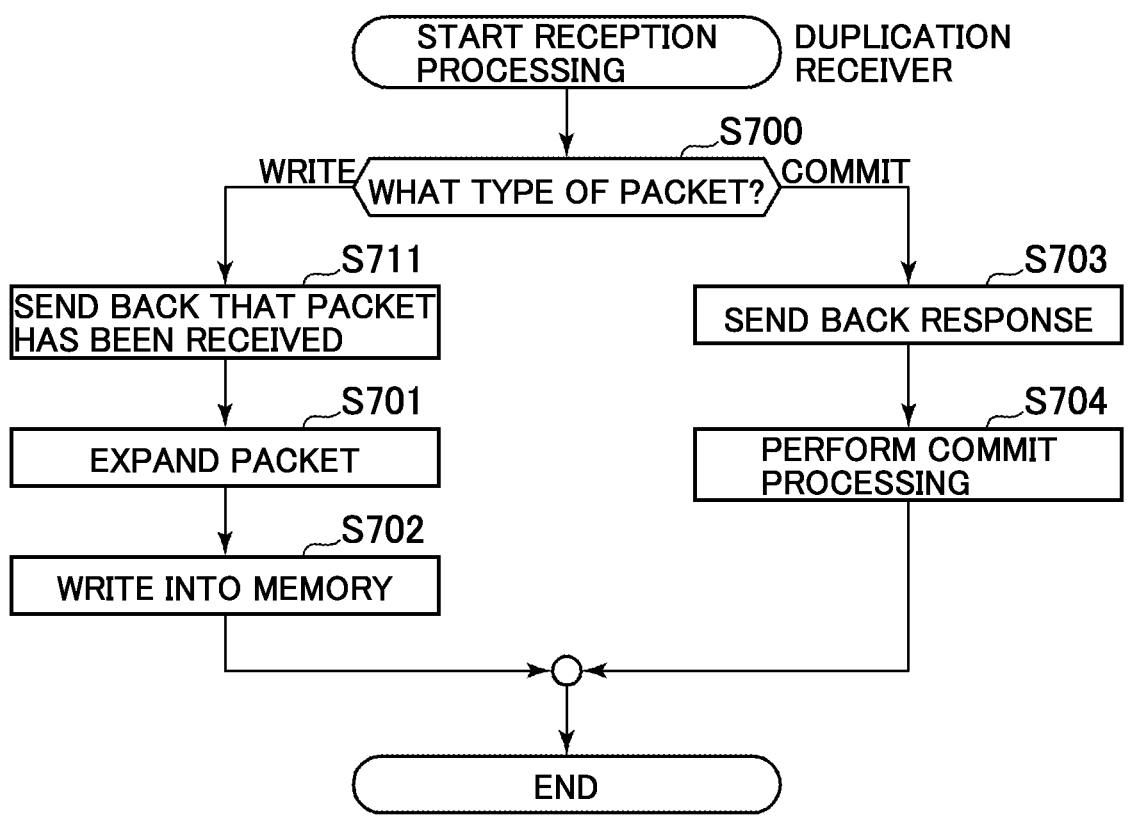
FIG. 11 shows a third embodiment of the present invention and it is a flowchart showing an example of processing performed in a duplication receiver.

FIG. 11 is a flowchart showing a flowchart of processing performed by the duplication receiver 5. The flowchart of this processing is equivalent to the flowchart of the first embodiment shown in FIG. 1 to which step S711 is added, and the other parts of the configuration of this embodiment are equal to those of the first embodiment.

This third embodiment is different from the first embodiment in that, if the type of a packet is Write, the duplication receiver 5 sends back information that the packet has been received to the relevant sender first (S711). Subsequently, as is the case with the first embodiment, the duplication receiver 5 expands the received packet, and executes writing processing into the nonvolatile memory 14.

In this third embodiment, after receiving a write request, the duplication receiver 5 can transmit a response without waiting a commit request.

Figure 12:
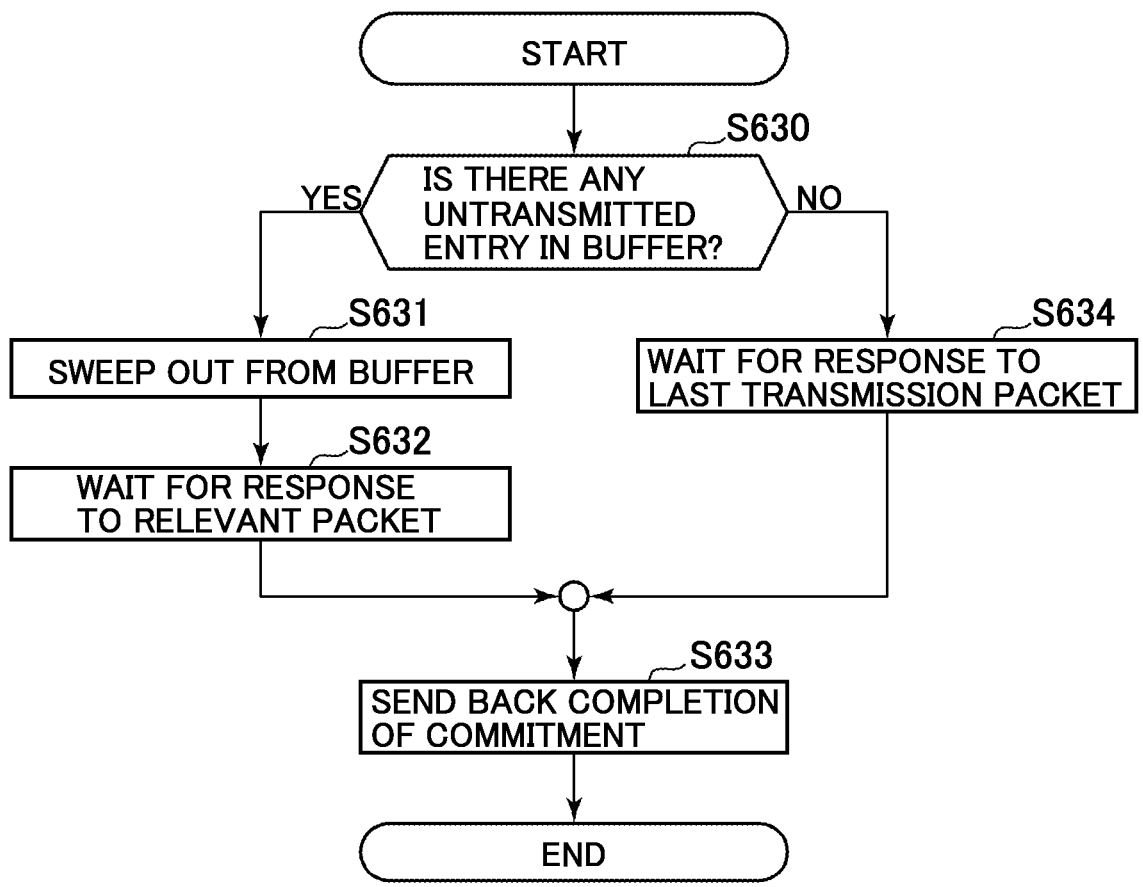
FIG. 12 shows the third embodiment of the present invention and it is a flowchart showing an example of commit processing.

FIG. 12 is a flowchart showing processing performed by the access receiver 3 when the access receiver 3 receives a commit request in the third embodiment. This processing is equivalent to step S306 and followings shown in FIG. 7.

In this processing the access receiver 3 judges whether there is any untransmitted entry in the relevant table 50 of the write buffer 6 or not (S630). If there is an untransmitted entry in the relevant table 50 corresponding to the processor core 15, the access receiver 3 sweeps out data from the buffer 6 (S631), and successively waits a response to a packet corresponding to the swept-out data from the external computer 1*b* (S632). After receiving the response, the access receiver 3 sends back the completion of the commitment (S633), and completes this processing.

On the other hand, if there is no untransmitted entry at the judgment of the step S630, the access receiver 3 waits for the response to the last transmitted packet from the external computer 1*b* (S633), and transmits the completion of the commitment after the arrival of the response (S634).

Due to the above processing, it becomes possible to reduce the delay of processing caused by a time difference between the timing of the transmission of data really transmitted by the processor core 15 and the execution of the relevant commitment. This result makes it possible that a time from the commit processing performed by the processor core 15 to the response of the completion of the commitment made by the FPGA 11 can be reduced, the processing time of the processor 12 is shortened, and the processing performance of the relevant computer system is improved.

CONCLUSION

Here, the present invention is not limited to the above-described embodiments, and includes various modifications. For example, the above-described embodiments have been described in detail for the purpose of explaining the present invention in an easily understood manner, therefore the present invention is not always required to include all the configurations described in the above-described embodiments. In addition, apart of the configuration of one embodiment can be replaced with a part of the configuration of another embodiment. Furthermore, a new embodiment may be made by adding the configuration of one embodiment to the configuration of another embodiment. In addition, a new embodiment of the present invention may be made by adding a different configuration to a part of the configuration of each embodiment, deleting a part of the configuration of each embodiment from each embodiment itself, or replacing a part of the configuration of each embodiment with a different configuration, or a combination of the abovementioned addition, deletion, and replacement may be applied to each embodiment to make a new embodiment of the present invention.

In addition, the entireties or parts of the above configurations, functions, processing units, processing means, and the like can be realized by hardware designed using, for example, integrated circuits. Alternatively, the above configurations, functions, and the like can be realized by software provided by processors' decoding and executing programs that realize the workings of the above configurations, functions, and the like. Information regarding programs, tables, files, and the like that are used for realizing the above functions can be disposed in storage devices such as a memory, a hard disk, and an SSD (Solid State Drive), or recording media such as an IC card, an SD card, and a DVD.

In addition, in the above-described drawings, control lines and information lines are shown in the case where they are indispensable for explaining the above embodiments, therefore all control lines and information lines necessary in the case of materializing the above embodiments are not shown. It is conceivable that in reality almost all components in almost every embodiment are interconnected.

The invention claimed is:

1. A computer system comprising:
a first computer including a first processor and a first nonvolatile memory; and
a second computer including a second processor and a second nonvolatile memory, the second computer being connected to the first computer,
wherein the first computer includes a redundant hardware that, on receiving a write command from the first processor, converts the write command both into writing operation into the first nonvolatile memory and into writing operation into the second computer;
wherein the redundant hardware includes a buffer, and on receiving the write command from the first processor, the redundant hardware writes the write data of the write command into the first nonvolatile memory and the buffer respectively, and on receiving a commit command from the first processor, the redundant hardware extracts the write data from the buffer and writes the write data into the second computer;
wherein the first processor includes a plurality of processor cores,
the buffer includes a plurality of tables corresponding to the processor cores respectively, and
on receiving the write command from one of the processor cores of the first processor, the redundant hardware writes the write data of the write command into one of the tables in the buffer corresponding to the one of the processor cores, and on receiving a commit command from the one of the processor cores of the first processor, the redundant hardware transmits the data from the one of the tables in the buffer corresponding to the one of the processor cores to the second computer.

2. The computer system according to claim 1, wherein on receiving a commit command from the first processor, the redundant hardware requests commitment of the second computer, and after receiving commit completion notification from the second computer, the redundant hardware transmits the completion of the commitment to the first computer.

3. The computer system according to claim 1, wherein the first computer and the second computer are connected to each other via a network, and
on receiving a commit command from the first processor, the redundant hardware calculates the usage rate of the network, and if the usage rate is smaller than or equal to a predefined threshold, the redundant hardware extracts the write data from the buffer and writes the write data into the second computer.

4. The computer system according to claim 3, wherein on receiving a commit command from the first processor, the redundant hardware calculates an elapsed time since the last commit command, and if the usage rate is smaller than or equal to the predefined threshold, and the elapsed time is larger than a predefined time, the redundant hardware extracts the write data from the buffer and writes the write data into the second computer.

5. The computer system according to claim 1, wherein on receiving the data writing from the first computer, the second computer writes the write data into the second nonvolatile memory after transmitting a response to the data writing to the first computer.

6. A method for realizing redundancy of nonvolatile memory by controlling writing in the nonvolatile memory using a first computer that includes a first processor and a first nonvolatile memory and a second computer that includes a second processor and a second nonvolatile memory and that is connected to the first computer, the method comprising:
a first step of the first processor issuing a write command;
a second step of a redundant hardware that is connected to the first nonvolatile memory receiving the write command from the first processor;
a third step of the redundant hardware converting the received write command both into writing operation into the first nonvolatile memory and into writing operation into the second computer;

a fourth step of the redundant hardware writing the data into the first nonvolatile memory; and a fifth step of the redundant hardware writing the data into the second computer;

wherein the fifth step includes:

a step of the redundant hardware writing the write data into a buffer included in the redundant hardware on receiving the write command from the first processor; and a step of the redundant hardware extracting the write data from the buffer and writing the write data into the second computer on receiving a commit command from the first processor;

wherein the first processor includes a plurality of processor cores, the buffer includes a plurality of tables corresponding to the processor cores respectively, and the fifth step further includes:

a step of the redundant hardware writing the write data into one of the tables in the buffer corresponding to one of the processor cores of the first processor on receiving a data writing command from the one of the processor cores of the first processor; and a step of the redundant hardware transmitting the data from the tables in the buffer corresponding to the one of the processor cores to the second computer on receiving a commit command from the one of the processor cores of the first processor.

7. The method for realizing redundancy of nonvolatile memory according to claim 6, wherein the fifth step includes:

a step of the redundant hardware requesting commitment of the second computer on receiving a commit command from the first processor; and a step of the redundant hardware transmitting the completion of the commitment to the first processor after receiving the commit completion notification from the second processor.

8. The method for realizing redundancy of nonvolatile memory according to claim 6, wherein the first computer and the second computer are connected to each other, and in the fifth step, the redundant hardware calculates the usage rate of the network on receiving a commit command from the first processor, and if the usage rate is smaller than or equal to a predefined threshold, the redundant hardware extracts the write data from the buffer and writes the write data into the second computer.

9. The method for realizing redundancy of a nonvolatile memory according to claim 8, wherein on receiving a commit command from the first processor, the redundant hardware calculates an elapsed time since the last commit command, and if the usage rate is smaller than or equal to the predefined threshold, and the elapsed time is larger than a predefined time, the redundant hardware extracts the write data from the buffer and writes the write data into the second computer.

10. The method for realizing redundancy of nonvolatile memory according to claim 6, the method further comprising:

a sixth step of the second computer receiving the data writing from the first computer; and a seventh step of the second computer writing the write data into the second nonvolatile memory after transmitting a response to the data writing to the first computer.

* * * * *